No. 857,672. PATENTED JUNE 25, 1907.
J. V. RICE, Jr.
VALVE GEAR FOR EXPLOSION ENGINES.
APPLICATION FILED JUNE 6, 1904.
4 SHEETS—SHEET 4.
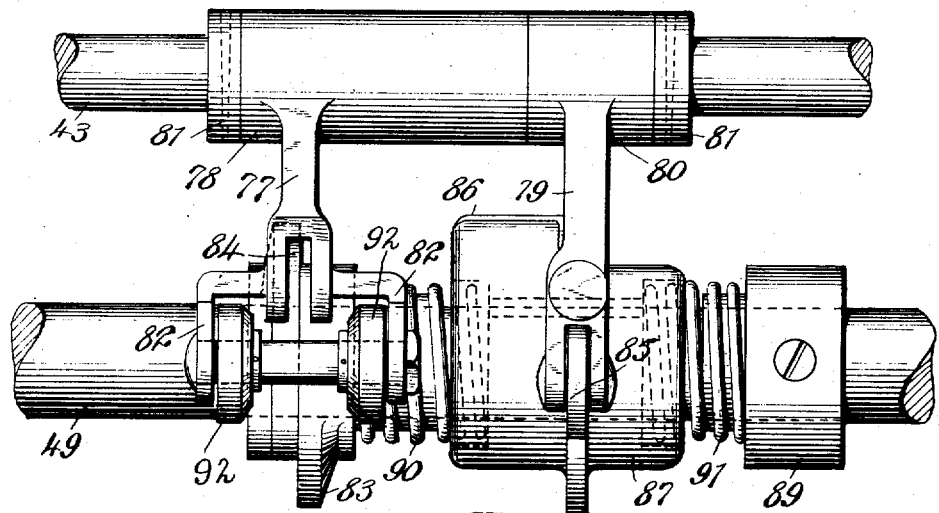
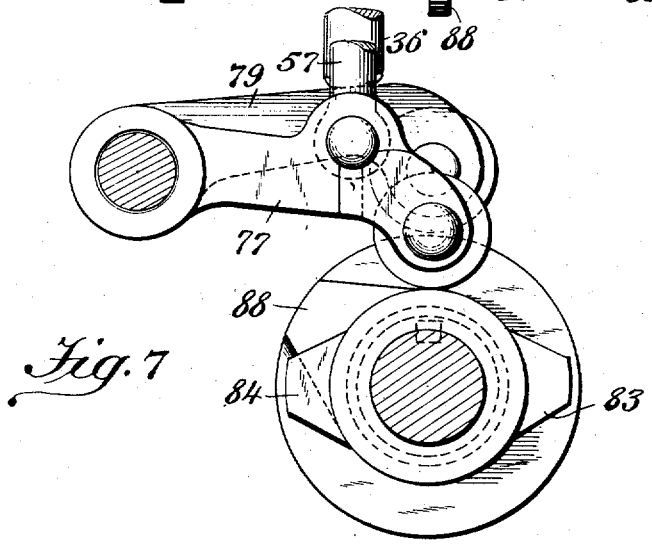

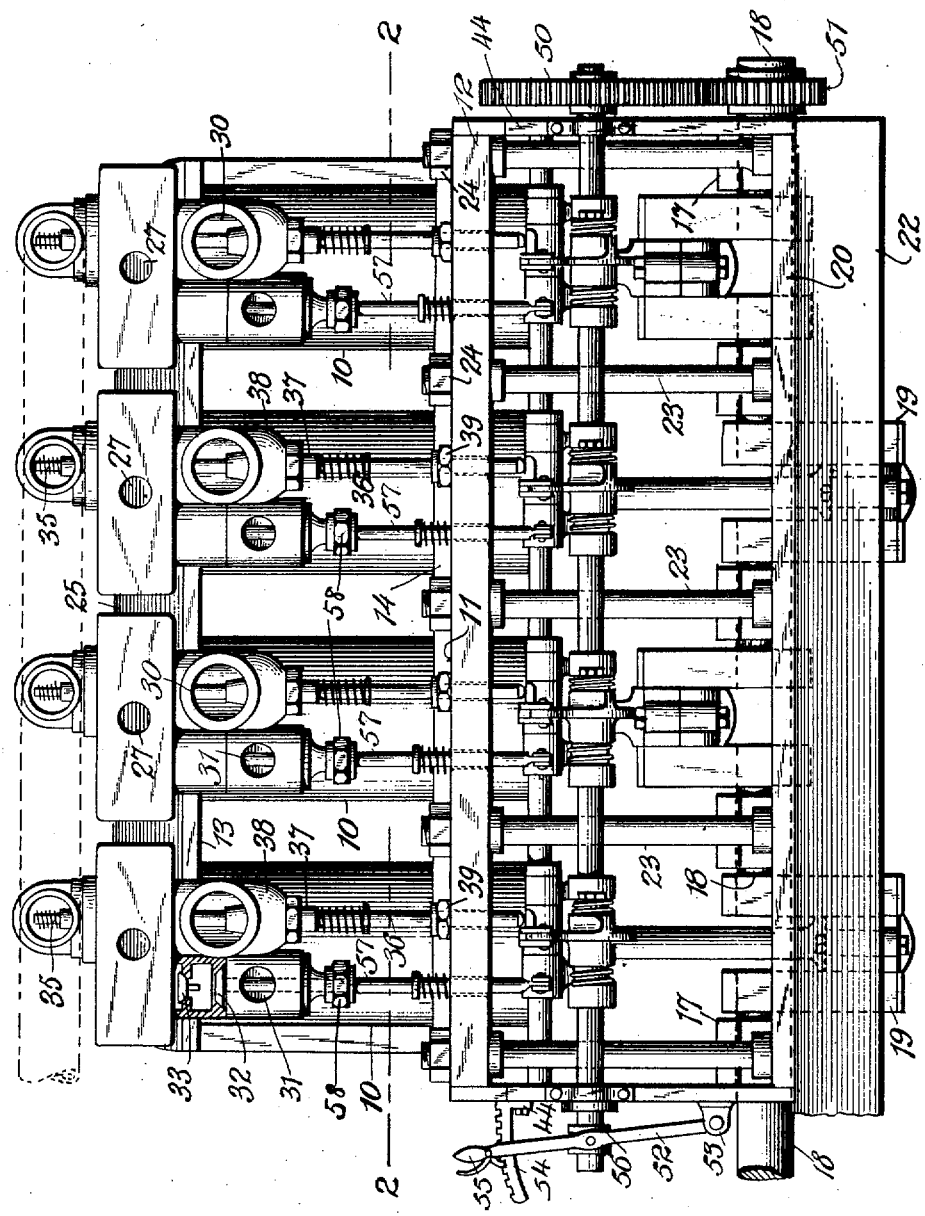

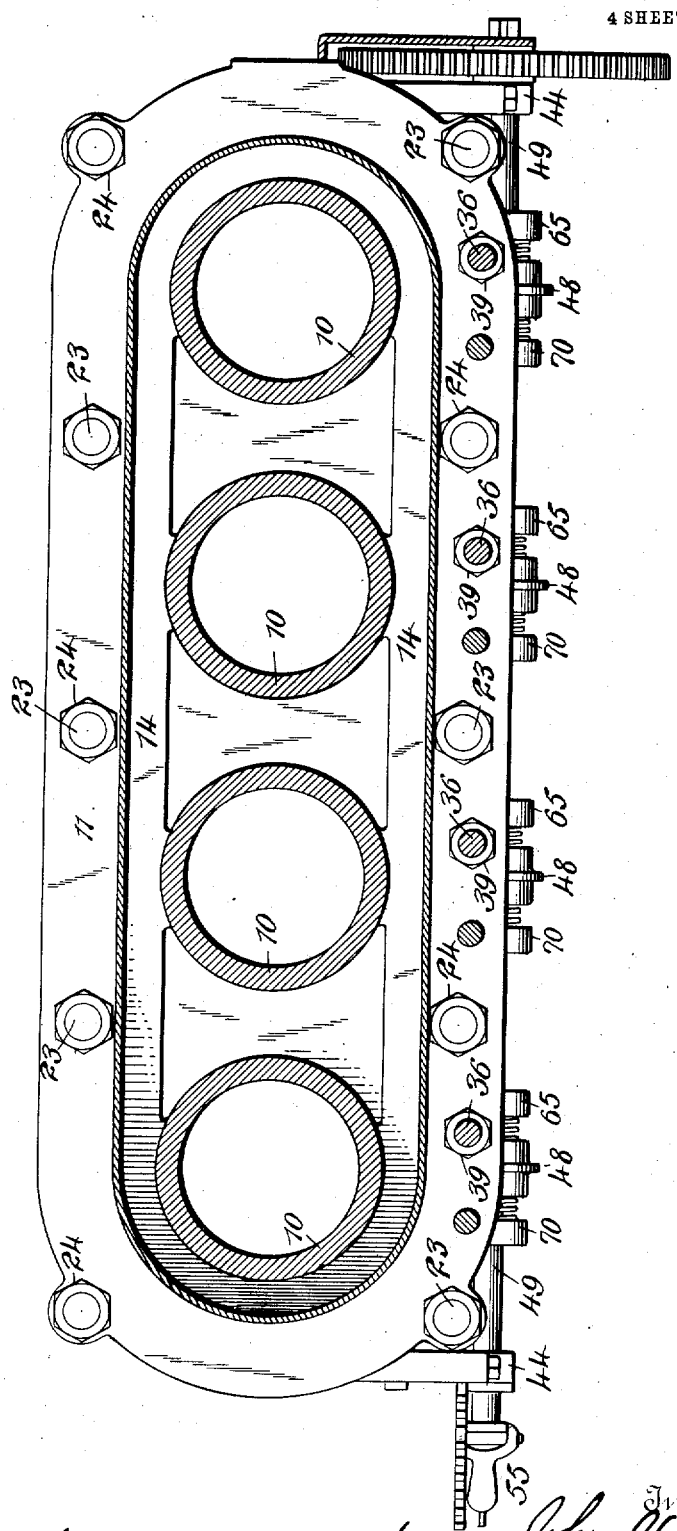

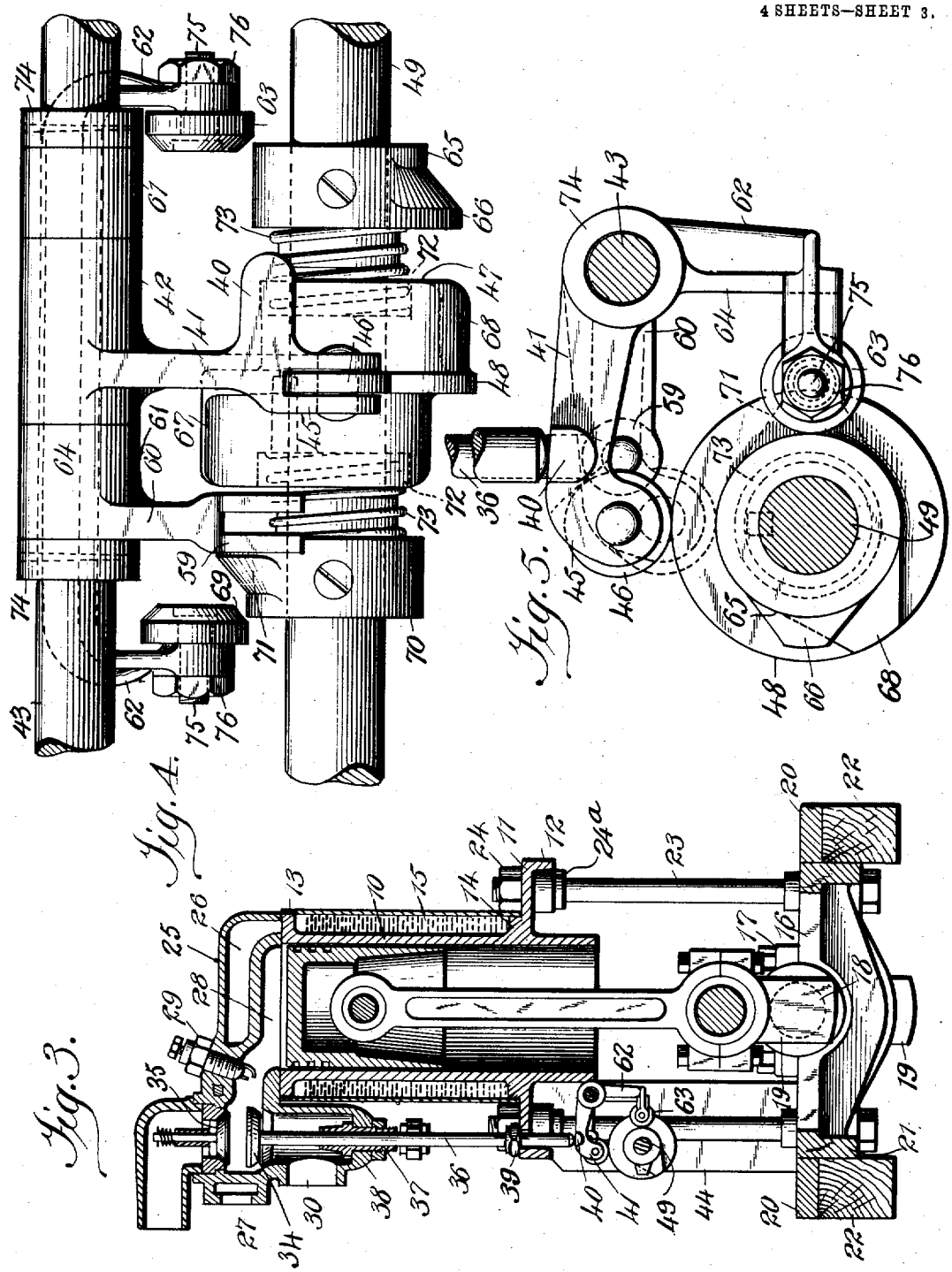

UNITED STATES PATENT OFFICE.

JOHN V. RICE, JR., OF BORDENTOWN, NEW JERSEY.

VALVE-GEAR FOR EXPLOSION-ENGINES.

No. 857,672.  Specification of Letters Patent.  Patented June 25, 1907.

Application filed June 6, 1904. Serial No. 211,301.

*To all whom it may concern:*

Be it known that I, JOHN V. RICE, Jr., a citizen of the United State of America, and a resident of Bordentown, in the county of Burlington and State of New Jersey, have invented certain new and useful Improvements in Reversing-Valve Gear for Explosion-Engines, of which the following is a specification.

My invention relates to gas engines, and more particularly to the valve-operating mechanism for same; and has for its object the simultaneous operation of the supply and exhaust valves of multiple cylinder gas or vapor engines; the reversing of motion, or the starting and stopping of same. These and other objects and details of my invention are more fully described in the following specification and pointed out in the appended claims.

In the drawings accompanying this specification and forming a part thereof, like reference characters are used to designate similar parts, and, Figure 1 represents a front elevation of an engine of four cylinders, with my improved valve-operating mechanism applied thereto; Fig. 2 is a horizontal section on the line 2—2 of Fig. 1; Fig. 3 is a cross-section of the same, through one of the cylinders; Fig. 4 is a plan view of one set of valve-operating cams; Fig. 5 is an end view of same through the shafts carrying the mechanism; Fig. 6 is a plan view of a modified form of the cams and co-operating mechanism; and, Fig. 7 is a side view of the latter form.

While engine shown in Fig. 1 is of the four cylinder type it is obvious that the mechanism is adapted for use in an engine of a quarter or less number of cylinders. The cylinders 10 are provided with a web or flange 11 uniting them, having its outer edge 12 reinforced so as to strengthen and brace the flange. Flanges 13 and 14 are also cast on the upper and lower ends of the cylinders, and on these is shrunk a jacket 15 as shown in Figs. 2 and 3, but for convenience of illustration is omitted from Fig. 1.

The flange 11 is perforated at various points to receive the upper ends of standards 23, which support the cylinders above the base 16, the latter being provided with bearing boxes 17 to carry the shaft 18, having the usual crank arms 19 which are in this case in opposition to each other, two being on one side of the shaft and two on the other side.

The base 16 has horizontal and vertical flanges 20 and 21, which are adapted to fit the two sides of the beams 22 or other similar support. The lower ends of the standards 23 may be set into suitable socket or tapped perforations, and their upper ends are made fast to the flange 11 by means of the nuts 24 and the collars $24^a$.

The cylinders have a common head 25, jacketed as at 26 for the circulation of a cooling fluid which enters through the tapped openings 27 adapted for pipe connections, (not shown in the drawings). In the head and connected with each cylinder are inlet and exhaust ports communicating with an explosion chamber 28, the latter provided with a sparker or igniter 29 of usual construction and adapted to fire the inflammable vapors behind the piston.

The inflammable vapor is admitted through the ports 31, and as the valve 32 is opened, as will be hereinafter explained, and the valve 33 also opened by the suction caused by the descent of the piston within the cylinder, the vapor rushes into the cylinder, with a certain amount of air, to be compressed by the return stroke of the piston preparatory to the explosion. The burned gases are exhausted through the ports 30 when the valves 34 are opened, as will be explained hereinafter, by means of certain cams and rocking arms operating on the valve stems 36.

When the vapor is flowing into the cylinders through the suction of the pistons puppet-valves 35, controlling the admission of air, are automatically opened by the suction and a certain quantity of air is mixed with the vapor to be compressed and exploded.

The stem 36 of the exhaust valve after passing through the packing gland 37 in the bottom of a pocket 38 below the exhaust opening 30, continues through a suitable perforation in the flange 11. The lower end of the stem 36 is seated on the lateral extension 40 of a rocking arm 41 whose hub 42 is loosely carried by the shaft 43 which runs the length of the engine and is journaled in the vertical pieces 44 connecting the base with the flange 11. This shaft 43 carries one of these rocking arms 41 for the exhaust of each cylinder, and each arm at its outer forked end 45 carries a roller 46 adapted to co-operate with a double cam 47 in effecting the rocking of the arm and the reciprocation of the valve stem 36. The double cam 47 has a dividing ridge 48 of a radius equal the extreme outer face of the two cams which flank it so that while the roller 46 is traveling on the ridge 48 the valve is held at its highest point, or open, and remains stationary.

The double cams 47 are splined on a shifting shaft 49, journaled in the end pieces 44, and carrying at one end a gear wheel 50 which meshes with a gear wheel 51 on the shaft 18, the shaft 49 being splined at the point where it carries the gear wheel 50 which has a groove in which plays said spline in order to permit of longitudinal movement of the shaft by means of a lever 52, the latter being pivoted to the end piece 44 by means of ears 53 and having a toothed segment 54 to receive its locking pawl 55, so that the shaft may be thrust in either direction and held there. The lever 52 is forked to carry a pivoted collar which surrounds the shaft between two washers 56.

The valve stems 57 of the gas or vapor supply ports also pass through packing glands 58 and perforations in the flange 11 and are pivoted to the forked ends 59 of rocking arms 60. These rocking arms are provided with hubs 61 which straddle the hubs of the rocking arms 41 and have depending arms 62 carrying rollers 63 on each side of the rocking arm 41, each pair of hubs 61 being joined by a web 64, which runs from one depending arm to the other.

The shaft 49 also carries on each side of the cam 47 the cams 65 and 70, whose respective cam faces 66 and 71, when in operation, engage and actuate one or the other of the rollers 63 or 69 of the depending arms 62 and rock the arm 60 to open the gas supply port 31. Fig. 4 shows all these cams occupying a neutral position but upon the shifting of the shaft 49 to the left the roller 69 will be on the path of the revolving cam 70 and consequently actuated, the roller 46 will play on the cam 68 and the exhaust be opened at a certain stage with relation to the opening of the supply port, but upon shifting the shaft to the right the position of the cams is changed, resulting in the reversal of the action of the port opening stems and a consequent reversal of the opening of the ports. The movement of the main shaft 18 is also reversed by this shifting of the shaft 49.

Each side of the cam 47 is provided with a socket 72 for the reception of a spring 73 which surrounds the shaft 49 and is interposed between the cam 47 and the cams 65 and 70, and these two springs tend to center the cam 47 between the two adjacent cams and allow it to yield, when pressure is brought to bear on either side of the ridge 48 by the roller 46, when the shaft is shifted. When the cam 47 has revolved sufficiently, however, to cause the roller to ride up the utmost pitch of either of the cam faces 67 or 68 the roller then follows the ridge and the cam returns to its original normal position between the other two cams on account of the pressure of one of the springs 73.

Each set of rocking arms 41 and 60 are held in place on the shaft 43 by collars 74, which are secured to the shaft by pins or otherwise, and the rollers 63 and 69 are carried on bolts with reduced stems 75 and locking nuts 76.

Figs. 6 and 7 show a modified form of the rocking arms and cams in which the gas supply valve is controlled by the arm 77 on a hub 78 loosely carried on the shaft 43 and the exhaust valve rocking arm 79 is on a hub 80, both hubs being retained in place by collars 81 secured on the shaft by pins or other means. The outer end of the arm 77 is forked to receive the valve stem 57 and permit of its attachment thereto, while extensions 82 of the forked arms carry the rollers 92 which are actuated by the cams 83 and 84. The exhaust valve rocking arm 79 carries at its outer end a roller 85, which rides on the cams 86 or 87 on the ridge 88, and actuates the valve stem. A collar 89 is secured to the shaft 49 and co-operates with the cams 83 and 84 to hold the hub of cams 86 and 87 under tension of the springs 90 and 91 and to return the hub to its normal position when the shaft 49 is thrust aside so as to change the working of the rocking arm 79.

Although I have shown the igniter 29 I have not considered it necessary to illustrate the electric circuit operating same nor the circuit closer connected therewith, as any well known form of brush and commutator may be applied to one of the rotating shafts.

Various other modifications may suggest themselves in the various details of construction without departing from the essential features of my invention as herein shown and described.

The operation of my improved valve-gear is as follows: With the valves in the position shown in Fig. 1 and the engine thrown in gear by the lever 52, the reciprocating movement of the pistons is started by the usual method. This movement of the pistons rotates the engaging pinions 51 and 50, the latter rotating the shaft 49 which in turn rotates the exhaust and supply-valve-operating cams. Depending upon the position of the shaft 49, one or the other of these sets of supply valve operating cams actuates its corresponding set of depending arms 62, carried by the shaft 43; which arms in turn actuate their integrally cast forked arms 59, pivotally connected to the valve stems 57. Thus the movement is transmitted to the valves and the supply valves are opened and the inflammable vapor rushes through the ports 31 into the cylinders. The supply valves are then closed by the springs after further revolution of the cams and the consequent movement of the stems. A certain amount of air is then mingled with the gas through the puppet valves 35, automatically opened by this inrush. Upon the reciprocation of the pistons this vapor is compressed, and while in this condition ignited by the sparkers 29. By the time this vapor ignites, the double cams 47 have rotated sufficiently to actuate the rocking arms 41, which in turn lifts the exhaust-valve-operating stems 36. These stems, on the explosion, open the valves 34, and provide the burned or expanded gases with outlets to the exhaust ports 30. On the longitudinal shifting of the rotatable shaft, through the formation of the cams and the position of the rocking arms, said rocking arms still bear upon the cams, thus allowing the simultaneous reversal of the action of the valves.

Having described my invention, what I claim as new and desire to secure by Letters-Patent, is:—

1. In a valve for a gas engine, the combination with one or more cylinders, of supply and exhaust valves, stems depending therefrom, a rotating shaft adapted to be shifted longitudinally, means for actuating same, cams carried by said shaft, a spring pressed cam between said cams, a non-rotatable shaft adjacent said rotating shaft, means carried by said shaft for operating the stems, said means being actuated by said cams.

2. In a valve for a gas engine, the combination with one or more cylinders, of supply and exhaust valves, stems depending therefrom, a rotating shaft adapted to be shifted longitudinally, means for actuating same, cams carried by said shaft, a spring pressed cam adjacent thereto, a non-rotatable shaft adjacent said rotating shaft, means carried by said shaft for operating the stems, said means being actuated by said cams.

3. In a valve for a gas engine, the combination with one or more cylinders, of supply and exhaust valves, stems depending therefrom, a rotating shaft adapted to be shifted longitudinally, means for actuating same, cams carried by said shaft, a spring pressed cam, a non-rotatable shaft, adjacent said rotating shaft, depending rocking arms carried by said shaft, said rocking arms being actuated by said cams on the shifting of said rotatable shaft, and other arms carried by said non-rotatable shaft between the hubs of said depending arms.

4. In a valve for a gas engine, the combination with one or more cylinders, of supply and exhaust valves, stems depending from same, a rotating shaft beneath same, means for driving said shaft, cams secured to said shaft, a spring-pressed cam carried between said cams, and means bearing on said fixed cams and operating the valve stems.

5. In a valve for a gas engine, the combination with one or more cylinders, of supply and exhaust valves, stems depending from same, a rotating shaft beneath same, means for driving said shaft, cams secured to said shaft, a spring-pressed cam carried between said cams, rocking arms operating the supply-valve stems and actuated by said fixed cams, and other arms operating the exhaust-valve stems and actuated by the spring-pressed cam.

6. In a valve for a gas engine, the combination with one or more cylinders, of supply and exhaust valves, stems depending from same, a non-rotatable shaft, rocking arms carried by said shaft and actuating said stems, a rotating shaft beneath the stems, said shaft being adapted to be shifted longitudinally, means for driving the shaft, means for actuating the supply valve stem operating rocking arms, and spring-pressed means on the shaft for operating the exhaust valve stem operating rocking arms during the longitudinal movements of said shaft.

7. In a valve for a gas engine, the combination with one or more cylinders, of supply and exhaust valves, stems depending from same, a rotating shaft beneath the stems and adapted to be shifted longitudinally, means for driving same, cams carried by said rotating shaft, a non-rotatable shaft, means bearing on said cams for actuating the stems, said means being carried by said non-rotatable shaft and consisting of rocking arms actuating the exhaust-valve stems, and other arms actuating the supply-valve stems, said latter arms being provided with hubs straddling the hubs of the exhaust-valve-operating arms and having depending arms carrying rollers.

8. In a gas engine, the combination with one or more cylinders, of a flange or web uniting the same and having perforations, valve stems playing through the perforations, a shaft running the length of the engine, rocking arms loosely carried by the shaft, cams actuating series of arms and valve stems, spring pressed cams actuating other series of arms and valve stems, a rotating shaft carrying the cams and adapted to be shifted longitudinally, and having a spline at one end, a wheel on the rotating shaft and having a groove in which plays said spline, means for driving the wheel, a loose collar on the other end of the shaft and between permanent washers, and a lever adapted to control the loose collar to shift the rotating shaft.

Signed at New York city this 16th day of May, 1904.

JOHN V. RICE, Jr.

Witnesses:
JOHN H. HAZELTON,
I. HEIBERG.